US008928592B2

(12) United States Patent
Oh et al.

(10) Patent No.: US 8,928,592 B2
(45) Date of Patent: *Jan. 6, 2015

(54) METHOD AND APPARATUS FOR ALPHABET INPUT

(71) Applicant: Shelko Electronics Co. Ltd., Seoul (KR)

(72) Inventors: Jong Min Oh, Seongnam-si (KR); Jong Hyok Oh, Seongnam-si (KR)

(73) Assignee: Shelko Electronics Co. Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/070,141

(22) Filed: Nov. 1, 2013

(65) Prior Publication Data

US 2014/0055362 A1 Feb. 27, 2014

Related U.S. Application Data

(62) Division of application No. 12/775,503, filed on May 7, 2010, now Pat. No. 8,576,176.

(30) Foreign Application Priority Data

May 12, 2009 (KR) .................. 10-2009-0041250
Mar. 16, 2010 (KR) .................. 10-2010-0023489

(51) Int. Cl.
*G06F 3/023* (2006.01)
(52) U.S. Cl.
CPC .................... *G06F 3/0233* (2013.01)
USPC .......................... 345/168; 345/171

(58) Field of Classification Search
USPC ........................................... 345/168
See application file for complete search history.

(56) References Cited

U.S. PATENT DOCUMENTS

| 7,663,604 | B2 | 2/2010 | Maruyama et al. | |
| 2006/0053387 | A1* | 3/2006 | Ording | 715/773 |
| 2008/0180403 | A1* | 7/2008 | Park et al. | 345/173 |
| 2008/0281582 | A1 | 11/2008 | Hsu et al. | |

FOREIGN PATENT DOCUMENTS

| JP | 2004-094389 A | 3/2004 | |
| JP | 2007-264284 A | 10/2007 | |
| JP | 2008-046844 A | 2/2008 | |
| WO | 02/31637 A1 | 4/2002 | |
| WO | WO 0231637 A1 * | 4/2002 | .............. G06F 3/02 |
| WO | 2007/037809 A1 | 4/2007 | |

OTHER PUBLICATIONS

International Search Report; PCT/JP2011/007221; Apr. 3, 2012.

* cited by examiner

*Primary Examiner* — Claire X Pappas
*Assistant Examiner* — Sepideh Ghafari
(74) *Attorney, Agent, or Firm* — Novick, Kim & Lee, PLLC; Jae Youn Kim; Sang Ho Lee (57) ABSTRACT

A method and apparatus for inputting letters by combining basic elements obtained by separating and symbolizing strokes of letters, so as to provide excellent letter intuitiveness and recognition. According to the present invention, a letter may be input by pressing one of or sequentially pressing two of keys to which basic elements ∪, l, ∩, ⊂, l, ⊃, ⌐, ⌐, ⌐, _, and ○ obtained by separating and symbolizing strokes of letters are assigned, and letters may be rapidly and conveniently input by minimizing key pressing paths.

15 Claims, 11 Drawing Sheets

METHOD AND APPARATUS FOR ALPHABET INPUT

CROSS-REFERENCE TO RELATED PATENT APPLICATION

This application claims the benefits of Korean Patent Application No. 10-2009-0041250, filed on May 12, 2009, and Korean Patent Application No. 10-2010-0023489, filed on Mar. 16, 2010 in the Korean Intellectual Property Office, the disclosures of which are incorporated herein in their entirety by reference.

BACKGROUND OF THE INVENTION

1. Field of the Invention

The present invention relates to a method and apparatus for inputting letters, and more particularly, to a method and apparatus for inputting letters via a simple manipulation by using a much less number of keys than the total number of alphabet letters.

2. Description of the Related Art

As well known, English is one of official international languages used in international conferences, etc., and is being widely used as a second language in many countries. In English, two or more of twenty six letters are combined to represent one word having a particular meaning.

On a QWERTY keyboard commonly used for computers or the like, twenty six letters are respectively assigned to different keys so that a user may easily input a desired word or sentence by pressing keys corresponding to the appropriate letters.

Recently, due to the rapid development of electronic technologies, various compact and portable devices such as cellular phones including smart phones, Moving Picture Experts Group (MPEG) audio layer 3 (MP3) players, digital multimedia broadcasting (DMB) terminals, satellite terminals, personal digital assistants (PDAs), and portable multimedia players (PMPs) have become very popular. In this regard, as the size of such devices can be the most competitive marketing advantage, manufactures have made continuous efforts to produce thin, light, and compact portable devices.

As such, portable devices typically have a keypad that contains a limited number of keys, for example, twelve letter keys, and a few additional function keys.

Figure 1:
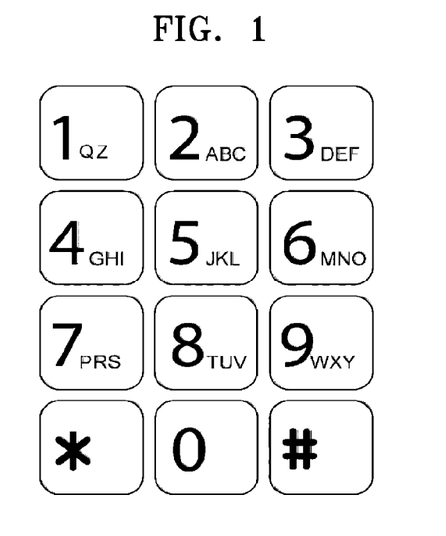
FIG. 1 illustrates a conventional phone-key keypad for inputting numbers and English letters.

FIG. 1 illustrates a conventional phone-key keypad for inputting numbers and English letters.

This type of keypad is common in coded phones, cellular phones, etc., and is refereed to as a phone-key keypad. In the phone-key keypad, from among twenty six letters, letters Q and Z are assigned to key number 1, letters A, B, and C are assigned to key number 2, letters D, E, and F are assigned to key number 3, letters G, H, and I are assigned to key number 4, letters J, K, and L are assigned to key number 5, letters M, N, and O are assigned to key number 6, letter P, R, and S are assigned to key number 7, letters T, U, and V are assigned to key number 8, and letters W, X, and Y are assigned to key number 9.

In the phone-key keypad having the above arrangement, a letter is input by pressing a specific key a certain number of times. For example, if a user desires to input the text "call me john", the keypad has to be manipulated as follows: triple pressing of key number 2→(a pause or a space)→single pressing of key number 2→triple pressing of key number 5→(a pause or a space)→triple pressing of key number 5→(a pause)→(a space)→single pressing of key number 6→double pressing of key number 3→(a pause or a space)→a space→single pressing of key number 5→triple pressing of key number 6→double pressing of key number 4→double pressing of key number 6.

In this case, since there is no correlation between the letters assigned to each key and no rule or logic with respect to the number of times that a key is pressed to input a specific letter, a user needs to be very careful when inputting desired letters. Also, an error in pressing a key frequently occurs because a plurality of letters are assigned to one key, and a large amount of time or a larger number of key pressings is required because a pause or pressing a space key is required. In order to solve this problem, Korean Patent Registration No. 10-0672773 entitled *Alphabet Input Apparatus and Alphabet Input Method* and registered on Dec. 27, 2006 (hereinafter referred to as cited reference 1) discloses a method of separating and symbolizing strokes of letters to symbolize the strokes and combining the symbols with each other to input a desired letter.

In cited reference 1, symbols such as /, |, \, ⊂, —, ⊃, V, O, and U are assigned to nine keys and one to four of the symbols are combined to input a desired letter. The letters are expressed by selecting the symbols as described below.

A: sequential pressing of /, \, and —
B: sequential pressing of |, ⊂, and ⊂
C: single pressing of ⊃
D: sequential pressing of | and ⊃
E: sequential pressing of |, —, —, and —
F: sequential pressing of |, —, and —
G: sequential pressing of ⊂, —, and |
H: sequential pressing of |, —, and |
I: single pressing of |
J: sequential pressing of | and U
K: sequential pressing of |, /, and \
L: sequential pressing of | and —
M: sequential pressing of |, \, /, and |
N: sequential pressing of |, \, and |
O: single pressing of O
P: sequential pressing of | and ⊃
Q: sequential pressing of O and \
R: sequential pressing of |, ⊃, and \
S: sequential pressing of ⊂ and ⊂
T: sequential pressing of — and |
U: single pressing of U
V: single pressing of V
W: sequential pressing of V and V
X: sequential pressing of \ and /
Y: sequential pressing of V and |
Z: sequential pressing of —, /, and —

Although the apparatus and method disclosed in cited reference 1 are convenient to input a letter by combining strokes of letters, users still have difficulties in using them because some letters require pressing a key four times and the above keypad assignment is not as instinctively and easily recognizable as handwriting. In cited reference 1, a total of sixty key pressings are required to input all alphabet letters.

SUMMARY OF THE INVENTION

The present invention provides a method and apparatus for inputting letters, which are capable of increasing user's convenience when inputting letters by allowing a user to input letters in the same manner as in handwriting direction and order.

According to an aspect of the present invention, there is provided a keypad apparatus for inputting letters, the keypad apparatus comprising a plurality of keys to which basic elements U, |, ∩, C, I, ⊃, J, ┼, ┌, ▬, and O obtained by separating and symbolizing strokes of letters are separately assigned, and the keypad apparatus recognizing letters by using a method comprising at least one of recognizing sequential pressing of the basic elements C and | as the letter a; recognizing sequential pressing of the basic elements | and ⊃ as the letter b; recognizing single pressing of the basic element C as the letter c; recognizing sequential pressing of the basic elements C and | as alphabet d; recognizing single pressing of the basic element ─ as the letter e; recognizing single pressing of the basic element ſ as the letter f; recognizing sequential pressing of the basic elements C and ⌡ as the letter g; recognizing sequential pressing of the basic elements | and ∩ as the letter h; recognizing single pressing of the basic element | as the letter i; recognizing single pressing of the basic element ⌡ as the letter j; recognizing sequential pressing of the basic elements | and C as the letter k; recognizing single pressing of the basic element | as the letter I; recognizing double pressing of the basic element ∩ as the letter m; recognizing single pressing of the basic element ∩ as the letter n; recognizing single pressing of the basic element O as the letter o; recognizing sequential pressing of the basic elements ├ and ⊃ as the letter p; recognizing sequential pressing of the basic elements C and ┤ as the letter q; recognizing sequential pressing of the basic elements | and ▁ as the letter r; recognizing sequential pressing of the basic elements C and ⊃ as the letter s; recognizing single pressing of the basic element ┬ as the letter t; recognizing single pressing of the basic element ∪ as the letter u; recognizing double pressing of the basic element | as the letter v; recognizing double pressing of the basic element ∪ as the letter w; recognizing sequential pressing of the basic elements ⊃ and ⊂ as the letter x; recognizing sequential pressing of the basic elements | and ⌡ as the letter y; and recognizing double pressing of the basic element ─ as the letter z.

According to the present invention, English letters may be simply and easily input in the same manner as in handwriting direction and order.

Also, English letters may be intuitively input by pressing keys a minimum number of times and key pressing paths on a keypad may be minimized.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining embodiments of the invention with reference to the attached drawings. Like reference numerals denote like elements in the drawings.

In the present application, a keypad includes user interfaces for pressing keys, e.g., a keyboard and a touch-screen.

According to a report regarding the frequency of use of communication tools in the USA, the number of voice calls has increased by 5% from 2007 to 2008, while the usage of short message service (SMS) has increased by 300%. People now regard that unidirectional communication such as sending a short message is more attractive than bidirectional communication such as phone calling.

Furthermore, a short text message is more interesting to people than a phone call. In addition, in line with the development of techniques for sending short messages, even competitions have been held for users who rapidly send short messages. Furthermore, as Internet services for cellular phones are currently being developed, a rapid and simple text input method is highly demanded.

However, an English letter input method for compact devices does not provide an appropriate solution. The keypad and input method described above in relation to FIG. 1 are inconvenient and also inputting letter requires a long time.

This fundamental problem arises from restriction of the number of keys in a cellular phone keypad where twenty-six letters are assigned to twelve keys. Although some currently commercialized compact devices such as cellular phones employ a QWERTY keyboard in order to cope with the above restriction, a physical restriction due to the size of cellular phones still remains. In particular, this restriction is exacerbated in the case of people who have large fingers.

Accordingly, a new apparatus and method of alphabet input that allows users to intuitively recognize keys and to conveniently, rapidly, and easily input English letters is required.

Figure 2A:
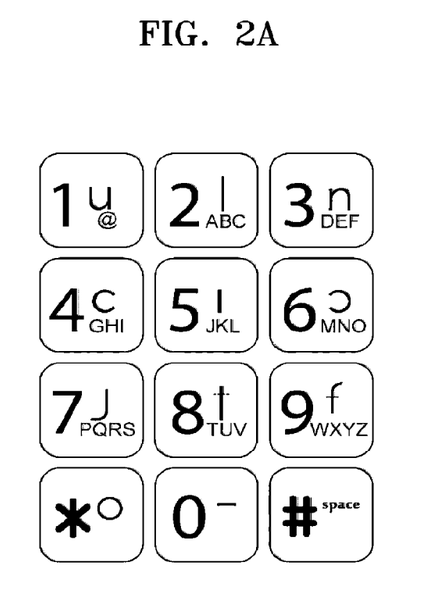
FIGS. 2A through 2C illustrate keypads according to embodiments of the present invention.
Figure 2B:
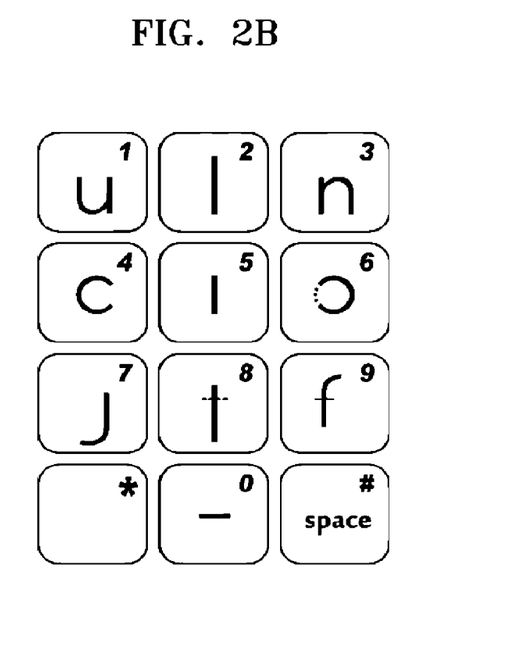
Figure 2C:
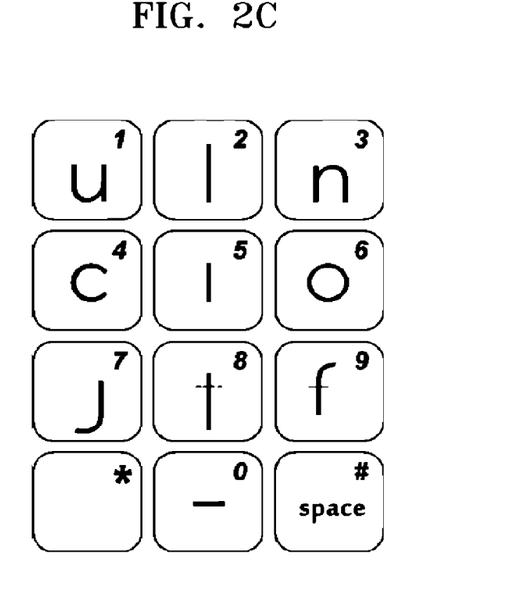

FIGS. 2A through 2C illustrate keypads according to embodiments of the present invention.

Referring to FIG. 2A, basic elements ∪, |, ∩, C, |, ⊃, ⌡, ┬, ſ, ─, and O, which are obtained by separating and symbolizing strokes of letters, are assigned to keypad buttons. English letters input by using the eleven basic elements are basically small letters. Capital letters may also be input by changing modes as when using a conventional phone-key keypad, and the basic elements are displayed on the top right side of each key.

The shapes of the basic elements are variable in consideration of user's convenience or design of the keypad. For example, the basic element † for inputting the letter t by pressing a single key does not always include a horizontal line, and a solid or dotted line may be used as the horizontal line in consideration of user's convenience. Also, the basic element ┌ for inputting the letter f may not include a horizontal line as illustrated in FIG. 2A or may include the horizontal line as a dotted or solid line. Although the horizontal line is not included, there is no problem for users to intuitively recognize the basic element ┌ as the letter f.

Before describing the keypad illustrated in FIG. 2B, a method of inputting letters by combining the basic elements illustrated in FIG. 2A will now be described in detail with reference to FIG. 3 in order to easily understand the structures of the modified keypads illustrated in FIGS. 2B and 2C.

Figure 3:
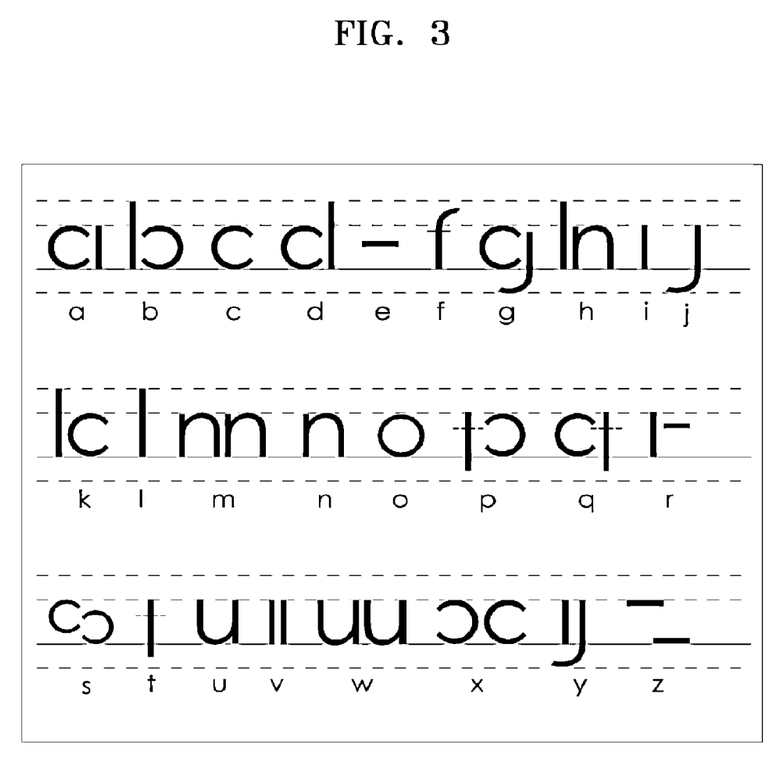
FIG. 3 shows combinations of basic elements for inputting small letters, according to an embodiment of the present invention.

FIG. 3 shows combinations of the basic elements ∪, ׀, ∩, ⊂, ׀, ⊃, ⌡, †, ┌, ━, and ○ for inputting small letters, according to an embodiment of the present invention.

Referring to FIG. 3, sequential pressing of ⊂ and ׀ is recognized as the letter a, sequential pressing of ׀ and ⊃ is recognized as the letter b, single pressing of ⊂ is recognized as the letter c, sequential pressing of ⊂ and ׀ is recognized as the letter d, single pressing of ━ is recognized as the letter e, single pressing of ┌ is recognized as the letter f, sequential pressing of ⊂ and ⌡ is recognized as the letter g, sequential pressing of ׀ and ∩ is recognized as the letter h, single pressing of ׀ is recognized as the letter i, single pressing of ⌡ is recognized as the letter j, sequential pressing of ׀ and ⊂ is recognized as the letter k, single pressing of ׀ is recognized as the letter I, double pressing of ∩ is recognized as the letter m, single pressing of ∩ is recognized as the letter n, single pressing of ○ is recognized as the letter o, sequential pressing of † and ⊃ is recognized as the letter p, sequential pressing of ⊂ and † is recognized as the letter q, sequential pressing of ׀ and ━ is recognized as the letter r, sequential pressing of ⊂ and ⊃ is recognized as the letter s, single pressing of † is recognized as the letter t, single pressing of ∪ is recognized as the letter u, double pressing of ׀ is recognized as the letter v, double pressing of ∪ is recognized as the letter w, sequential pressing of ⊃ and ⊂ is recognized as the letter x, sequential pressing of ׀ and ⌡ is recognized as the letter y, and double pressing of ━ is recognized as the letter z.

These combinations may vary in order to increase user's convenience or intuitiveness. For example, sequential pressing of ┌ and ━ may be recognized as the letter f, double pressing of ○ may be recognized as the letter s, sequential pressing of ━ and ׀ may be recognized as the letter t, sequential pressing of ∪ and ⌡, or ׀ and † may be recognized as the letter y, and single pressing of ⊃ may be recognized as the letter b.

Also, in order to generate each alphabet letter by double key pressing for a unity purpose, an additional key such as a space key (e.g., a # key in FIG. 2) is pressed after a single key is pressed. If double key pressing method is used for each letter and if a key is pressed to input a letter and then another key is pressed to input another letter, the keys may be prevented from being combined to input an unintended letter. As such, a time delay due to a pause after a single key is pressed may be reduced.

However, if a predetermined pause period passes after a single key is pressed, input of a letter recognized by pressing the single key may be confirmed and thus a subsequent key input may not influence the input of the letter generated by a single key.

The method of inputting letters illustrated in FIG. 3 may be implemented as software, and thus may be written in a computer-readable programming language so as to be executed by a terminal device. If the terminal device includes a touchpad, the keypad illustrated in FIG. 2A, 2B, or 2C may be displayed on the touchpad and thus desired letters may be input by using the above-described method.

Also, the software may be stored in a computer-readable recording medium.

As illustrated in FIG. 3, when children learn how to write, they start to write small letters using as reference a third line from among four lines. In this case, a short vertical line at a right side of a letter as in the letter a is represented by using the basic element ׀, a long vertical line from a first line to the third line as in the letter b or d is represented by using the basic element ׀, and a long vertical line from a second line to a fourth line as in the letter p or q is represented by using the basic element †.

Figure 4:
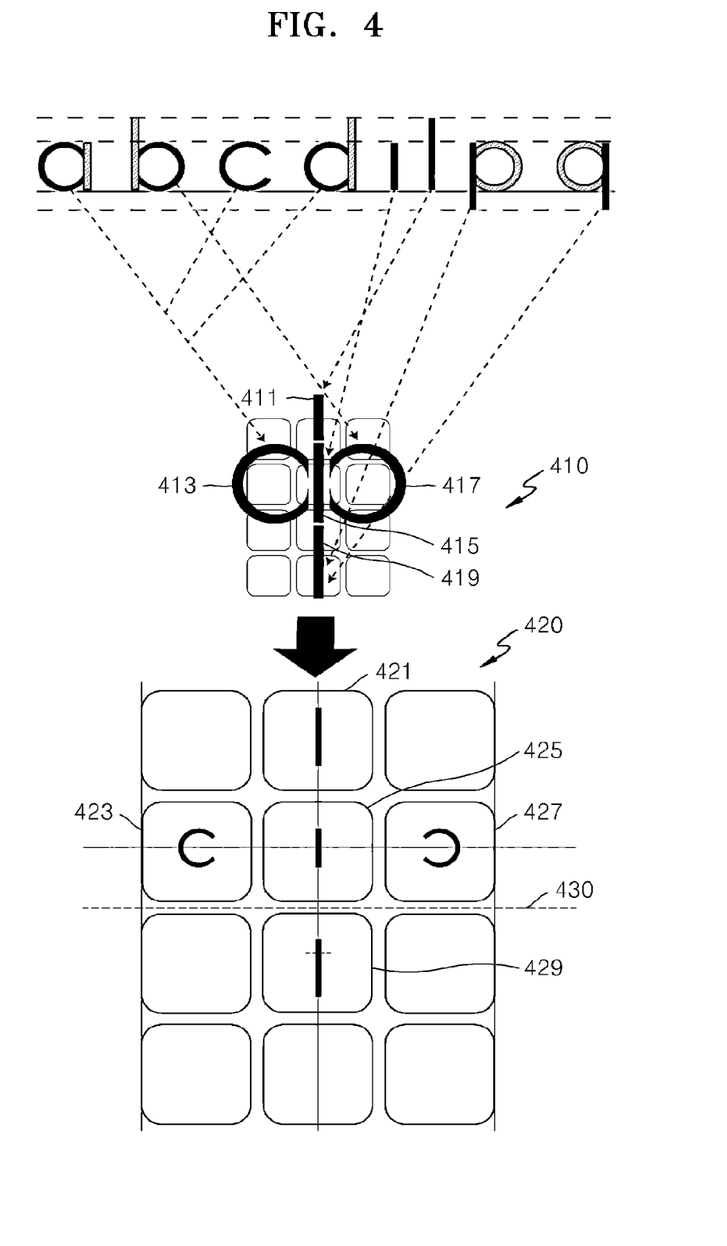
FIG. 4 is a diagram for describing a method of assigning five main basic elements on a keypad, according to an embodiment of the present invention.

Also, in order to press the basic elements according to the letter writing direction and order illustrated in FIG. 3, the assignment and alignment of five main basic elements ׀, ⊂, ׀, ⊃, and † as illustrated in FIG. 4 are important.

The keypad illustrated in FIG. 2B will now be described. The keypad illustrated in FIG. 2B is a modification of the keypad illustrated in FIG. 2A. In FIG. 2B, the basic elements ∪, ׀, ∩, ⊂, ׀, ⊂, ⌡, †, ┌, and ━, which are obtained by separating and symbolizing strokes of letters, are assigned on the keypad. Compared to FIG. 2A, the number of basic elements is reduced to ten in FIG. 2B. As in FIG. 2A, English letters input by using the ten basic elements are basically small letters. Capital letters may also be input by changing modes as when using a conventional phone-key keypad, and the basic elements are displayed on the top side of each key.

The shapes of the basic elements are also variable in consideration of user's convenience or design of the keypad. For example, the basic element † for inputting the letter t by pressing a single key does not always include a horizontal line, and a solid or dotted line may be used as the horizontal line in consideration of user's convenience. Also, the basic element ┌ for inputting the letter f may not include a horizontal line as illustrated in FIG. 2B or may include the horizontal line as a dotted or solid line. Although the horizontal line is not included, there is no problem to intuitively recognize the basic element ┌ as the letter f. Also, there is no problem to intuitively recognize the basic element ⊂ as the letter o or a semicircle of the letter b or p.

Compared to FIG. 2A, single pressing of the basic element ⊂ may be recognized as the letter o in the keypad illustrated in FIG. 2B. The rest of the input method is almost the same as the method described with respect to FIG. 2A.

In FIG. 2C, the basic element ⊂ illustrated in FIG. 2B is replaced by a basic element ○. Likewise, the basic element ○ key may be intuitively recognized as the letter o or a semicircle of the letter b or p.

FIG. 4 is a diagram for describing a method of assigning five main basic elements ׀ 411, ⊂ 413, ׀ 415, ⊃ 417, and † 419 on a keypad 420, according to an embodiment of the present invention.

Initially, all of the illustrated letters a, b, c, d, i, l, p, q, and t may be formed by using a shape 410 illustrated at the center of FIG. 4. Also, the method corresponds to the order or direction of writing the letters a, b, c, d, i, l, p, q, and t. The basic elements ׀ 411, ⊂ 413, ׀ 415, ⊃ 417, and † 419 of the shape 410 are scattered and assigned on the keypad 420.

On the keypad 420, a central horizontal line 421 may be assumed to correspond to the third line, which is used as the reference line for writing small letters, from among four lines.

Here, the letters a, b, c, d, i, l, p, q, and t may be intuitively input by respectively pressing sequentially keys 421, 423, 425, 427, and 429. In particular, except for the letters c, i, l, and t that may be input by pressing a single key, the letters a, b, d, p, and q may be input by sequentially pressing two neighboring keys.

One who understands English to a certain degree would accurately know where to draw a curve and a straight line to write English letters and thus may easily input small letters by combining the above keys 421, 423, 425, 427, and 429 as if the letters are written with a pen. Also, a writing order is always from left to right and an order of pressing basic elements corresponds to the writing order. For example, in FIG. 4, the letter q may be input by sequentially pressing the basic elements ⊂ 423 and ┼ 429 (423→429) so as to correspond to the writing order of the letter q.

After assigning the basic elements | 411, ⊂ 413, | 415, ⊃ 417, and ┼ 419, the other basic elements have to be assigned. When the other basic elements are assigned, intuitiveness of inputting letters and minimum key pressing order for inputting letters should also be considered.

Figure 5:
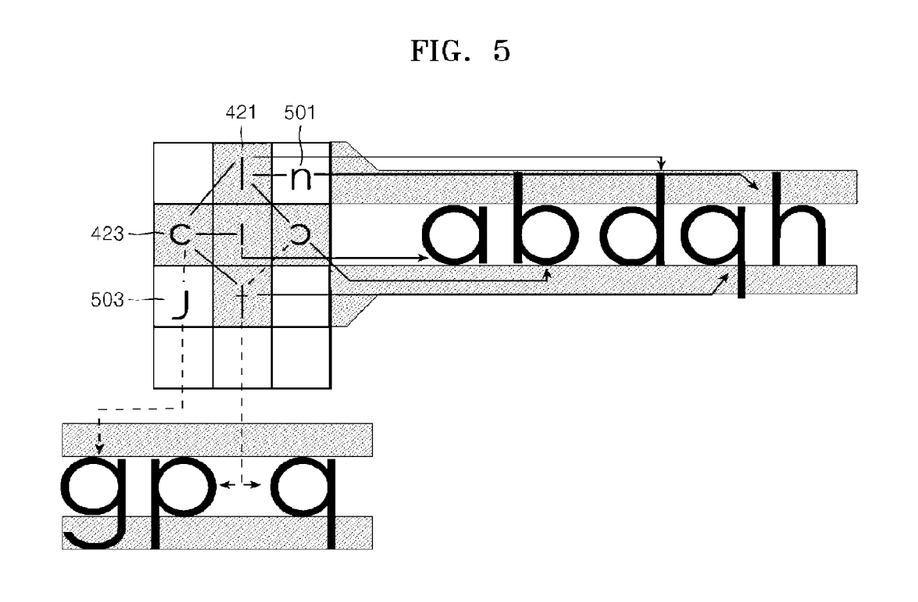
FIG. 5 is a diagram for describing a method of assigning the other basic elements on a keypad, according to an embodiment of the present invention.

FIG. 5 is a diagram for describing a method of assigning the other basic elements ∩ and ⌣ 503 on a keypad, according to an embodiment of the present invention.

As the other basic elements ∩ 501 and ⌣ 503 are assigned, the letter g is input by sequentially pressing the basic elements ⊂ 423 and ⌣ 503, and the letter h is input by sequentially pressing the basic elements | 421 and ∩ 501. In this case, the key pressing order and direction correspond to the writing order and direction, and keys to be pressed to input a letter are adjacent to each other.

Figure 6:
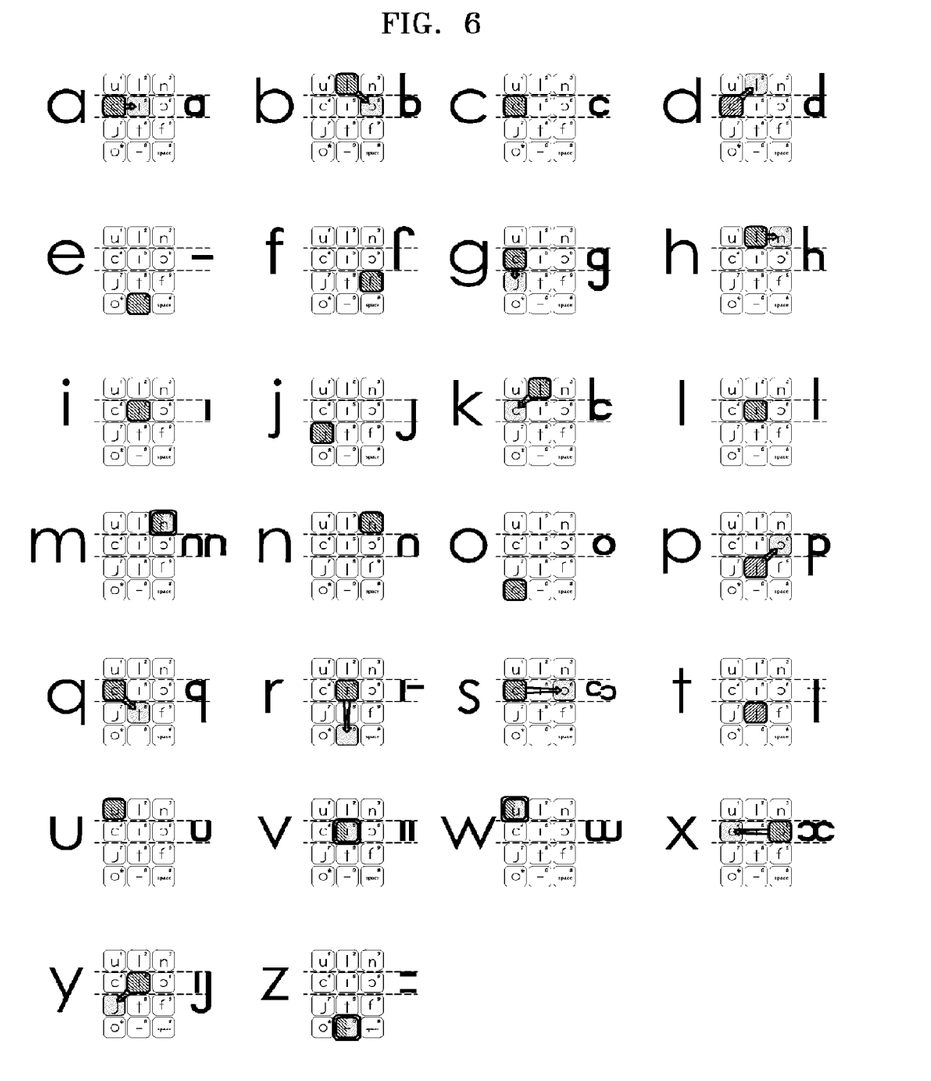
FIG. 6 shows overall key pressing orders for inputting small letters on a keypad, according to an embodiment of the present invention.

FIG. 6 shows overall key pressing orders for inputting small letters on a keypad, according to an embodiment of the present invention.

As illustrated in FIG. 6, the letters a, b, d, g, h, k, p, q, and y may be input by sequentially pressing two neighboring (including diagonally neighboring) keys, and the letters c, e, f, i, j, l, n, o, t, u, and v may be input by pressing a single key. According to a selection of a user, the letter b may be input by pressing a single key. Also, the letters m, v, w, and z may be input by repeatedly pressing a key. From among the twenty six alphabet letters, only three letters r, s, and x are input by sequentially pressing non-neighboring keys. However, the key pressing order and direction for inputting the letters r, s, and x correspond to order and direction for intuitively writing the letters r, s, and x.

In consideration of user's convenience, when a user desires to input capital letters, a small letter may be input and then an additional function key may be pressed to change the small letter into a capital letter, or an input mode may be toggled and changed from a small letter mode to a capital letter mode or vice versa by pressing the additional function key.

Figure 7:
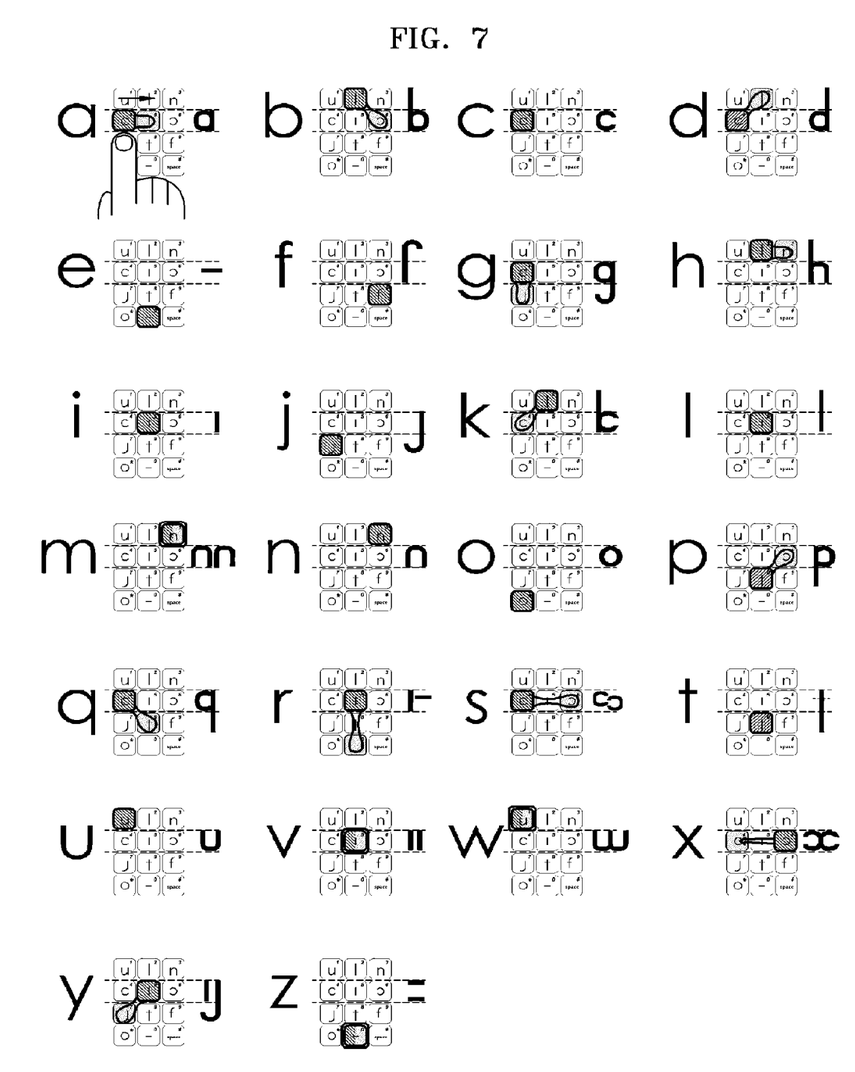
FIG. 7 shows overall key dragging orders for inputting small letters on a keypad, according to an embodiment of the present invention.

FIG. 7 shows overall key dragging orders for inputting small letters on a keypad, according to an embodiment of the present invention.

If the keypad is of a touch type, an initial key may be touched and then a stylus pen that touches the initial key may be dragged to a subsequent key according to the key pressing orders illustrated in FIG. 6 without taking the stylus pen off the keypad. A keypad apparatus may recognize a key on which an initial touch is sensed as the initial key, and a key on which the touch is terminated after dragging as the subsequent key. For example, in order to input the letter a, a ⊂ key that is assigned may be initially touched, and then a finger or a stylus pen that touches the ⊂ key may be dragged to and then be taken off a | key.

In this case, the dragging method is also useful to sequentially press two non-neighboring keys. For example, as illustrated in FIG. 7, in order to input the letter x, a finger may touch a ⊃ key, the finger may move on the | key, and the finger motion may end on the ⊂ key. In this case, only the initially touched ⊃ key and the ultimately touched ⊂ key may be recognized to input an alphabet letter without recognizing the intermediately passed | key as a pressed key.

If double touching of a key is required, a user may use one of a plurality of methods. For example, first, the key may be continuously pressed for more than a predetermined period of time. Second, the key may be dragged from left to right or from top to bottom. Alternatively, the key may be simply touched twice.

In more detail, when a ∩ key is repeatedly touched to input the letter m, according to the above second method, as illustrated in FIG. 7, the ∩ key is dragged from left to right. Although the ∩ key may be dragged from top to bottom, the dragging from left to right is appropriate in consideration of writing intuitiveness.

According to the method illustrated in FIG. 6 or 7, various punctuation marks may also be easily input. This function is not enabled on a general English keypad but is enabled on the keypad according to the present invention because basic elements formed by separating and symbolizing strokes of letters are assigned on the keypad.

For example, sequential pressing of | and ○ may be recognized as an exclamation mark (!), sequential pressing of ⊃ and ○ may be recognized as a question mark (?), double pressing of ○ may be recognized as a period (.), double pressing of ⊃ may be recognized as a comma (,), and sequential pressing of ○ and ⊂ may be recognized as an at mark (@). In this manner, punctuation marks may be directly input via the keypad according to the present invention without using an additional special character keyboard or mode.

Also, in addition to the English letters, various other letters, e.g., Spanish, German, French, and Portuguese letters, may also be easily input by using the keypad according to the present invention. Table 1 shows variations in inputting other letters according to the number of times that a special key is pressed after an English letter is input.

TABLE 1

| [a → A] | $1^{st}$ | $2^{nd}$ | $3^{rd}$ | $4^{th}$ |
| --- | --- | --- | --- | --- |
| a | á | A | Á | a |
| e | é | E | É | e |
| i | í | I | Í | i |
| o | ó | O | Ó | o |
| u | ú | ü | U | u |
| n | ñ | N | Ñ | n |

However, the variations shown in Table 1 are only examples, and all letters with English equivalents may be input by repeatedly pressing a special key. For example, after the letter a is recognized, variations such as "á, ä, à, â, ã, å" may be displayed on a screen by repeatedly pressing a special key. Also, corresponding capital letters may also be displayed.

As another example, after the letter n is recognized, variations such as "ń, n, ň, ñ, n" may be displayed on a screen by repeatedly pressing a special key. Also, corresponding capital letters may also be displayed.

Furthermore, in addition to Spanish, German, French, and Portuguese letters, Greek letters (α, β, γ, δ, ε, ζ, η, θ, ι, κ, μ, ν, ξ, ο, π, ρ, σ, τ, υ, φ, χ, Ψ, and ω) similar to English letters may also be input by using the basic elements according to the present invention. In this case, Greek letters may be input in an English mode or by changing the mode into a Greek mode. In order to input Greek letters, one or more of the basic elements ∪, Ⅰ, ∩, ⊂, Ⅰ, ⊃, ⌡, ⏐, ⌠, ─, and ○ are sequentially pressed, and a Greek letter corresponding to the sequentially pressed basic elements is determined. For example, sequential pressing of Ⅰ, ⊂, and Ⅰ may be recognized as Greek letter α, sequential pressing of ⏐, ⊃, and ⊃ may be recognized as Greek letter β, sequential pressing of ─ and Ⅰ may be recognized as Greek letter γ, sequential pressing of ⊂ and ○ as Greek letter δ, double pressing of ⊂ may be recognized as Greek letter ε, sequential pressing of ─ and ⌡ may be recognized as Greek letter ζ, sequential pressing of ∩ and ⏐ may be recognized as Greek letter η, sequential pressing of ○ and ─ may be recognized as Greek letter θ, single pressing of Ⅰ as may be recognized Greek letter i, sequential pressing of Ⅰ and ⊂ may be recognized as Greek letter K, sequential pressing of Ⅰ and Ⅰ may be recognized as Greek letter λ, sequential pressing of ⏐ and ∪ may be recognized as Greek letter μ, double pressing of Ⅰ may be recognized as Greek letter ν, sequential pressing of ─, ⊂, and ⌡ may be recognized as Greek letter ξ double pressing of ○ as Greek letter o, sequential pressing of ─, Ⅰ, and Ⅰ may be recognized as Greek letter π, sequential pressing of ⏐ and ○ may be recognized as Greek letter ρ, sequential pressing of ○ and ─ may be recognized as Greek letter σ, sequential pressing of ─ and Ⅰ may be recognized as Greek letter τ, sequential pressing of ─ and ∪ may be recognized as Greek letter u, sequential pressing of ○ and Ⅰ may be recognized as Greek letter φ, sequential pressing of ∪ and ∩ may be recognized as Greek letter χ, sequential pressing of ∪ and ⏐ may be recognized as Greek letter Ψ, and sequential pressing of ∪ and Ⅰ may be recognized as Greek letter ω, thereby inputting and displaying Greek letters on a screen.

Also, Russian letters (а, б, В, г, д, є, Ж, з, И, й, К, л, М, Н, О, п, р, с, t, у, ф, х, Ц, ч, Ш, щ, Ъ, ы, ь, э, ю, and я may be input by using the basic elements of the present invention.

When various letters are input by using a keypad on which the basic elements of the present invention are assigned, the letters may be intuitively input and thus key assignment may be easily learned and memorized. Furthermore, the number of key pressings or touches may be quite efficiently reduced. Accordingly, the keypad of the present invention may be applied to teaching or game tools for teaching the alphabet to small children, as well as mobile communication terminals such as cellular phones. Children who start to recognize and learn the alphabet may acquire a method of creating letters by combining the basic elements according to the present invention, instead of directly memorizing letters such as A, B, and C. Thus, the present invention may be useful for learning and playing letter games.

Also, if English letters or other letters are input by using a keypad on which the basic elements of the present invention are assigned, the number of key pressings may be reduced in comparison to a typical keypad. For example, it is assumed that a user sends the following message by using a short message service (SMS).

"John, call me right now we r waiting for u at t mart"

In order to input the above sentence by using the phone-key keypad illustrated in FIG. 1, the keys should be pressed eighty-three times. On the other hand, if the keypad according to the present invention is used, the keys should be pressed only sixty-eight times excluding the comma (,) and thus the number of key pressings may be about 82% of the previous case. Moreover, since the keypad according to the present invention has an intuitive key assignment that can be easily memorized, a sentence may be easily input without even looking at a keypad of a terminal device.

Figure 8:
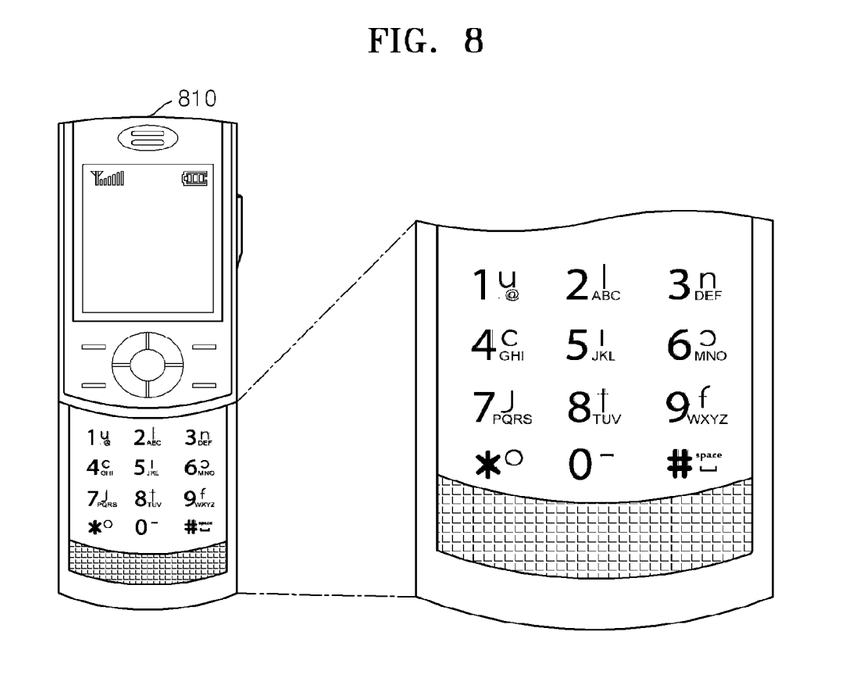
FIG. 8 illustrates a cellular phone including the keypad illustrated in FIG. 2A, according to an embodiment of the present invention.

FIG. 8 illustrates a cellular phone 810 including the keypad illustrated in FIG. 2A, according to an embodiment of the present invention.

As illustrated in FIG. 8, the keypad illustrated in FIG. 2A may be applied to the cellular phone 810. In consideration of user's convenience, the keypad also has a typical input mode. The user may select the typical input mode or a stroke combination mode according to the present invention. Although FIG. 8 illustrates a slide-type cellular phone, the keypad may also be applied to all cellular phones or mobile devices of a folder type, a flip type, and a touch type.

FIGS. 9A through 9D illustrate various key assignments of basic elements ∪, Ⅰ, ∩, ⊂, Ⅰ, ⊃, ⌡, ⏐, ⌠, ─, and ○ on a keypad, according to embodiments of the present invention.

As described above in relation to FIG. 3, it is recommended not to change the positions of the five main basic elements Ⅰ, ⊂, Ⅰ, ⊃, and ⏐, which are respectively assigned to key numbers 2, 4, 5, 6, and 8 in a cross shape, in consideration of user's convenience. However, these positions are merely recommended to provide an optimal input condition and may freely vary in consideration of user's convenience.

Figure 9A:
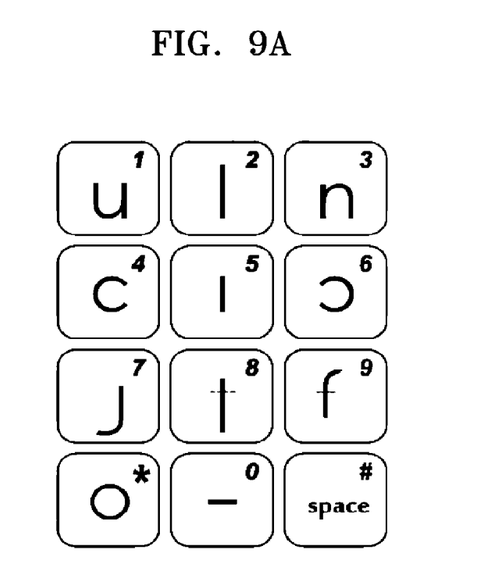
FIGS. 9A through 9D illustrate various key assignments of basic elements on a keypad, according to embodiments of the present invention.

FIG. 9A shows an optimal key assignment on the keypad.

In FIG. 9A, the other basic elements ∪, ∩, ⌡, and ⌠ are respectively assigned to key numbers 1, 3, 7, and 9 keys. This type of key assignment is an optimal assignment because letters h, y, etc., may be input by sequentially pressing two neighboring keys and a key pressing order and direction correspond to a writing order and direction. The two remaining basic elements ─ and ○ may be appropriately assigned to the remaining keys of the keypad. However, since the basic element ─ is used to input the letter e that is the most commonly used vowel, it may be more convenient to assign the basic element ─ to the key number 0.

In the key assignment illustrated in FIG. 9A, the basic elements are symmetric in shape. For example, the basic elements assigned to the key numbers 1 and 3, the key numbers 4 and 6, and the key numbers 7 and 9 are mirror-symmetric or 180°-symmetric in shape such that the key assignment illustrated in FIG. 9A is highly design-competitive.

Figure 9B:
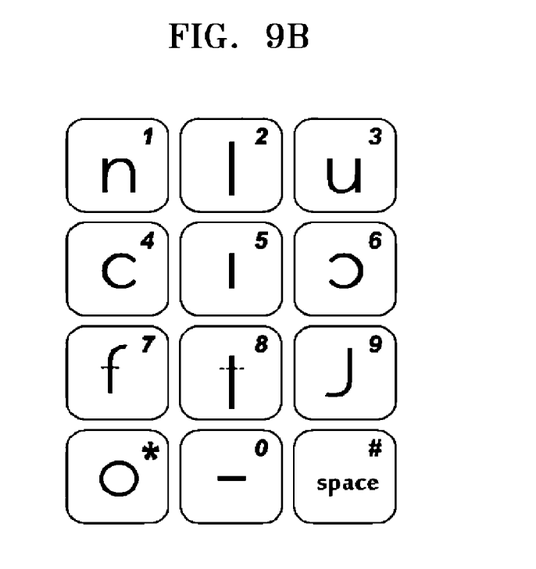
Figure 9C:
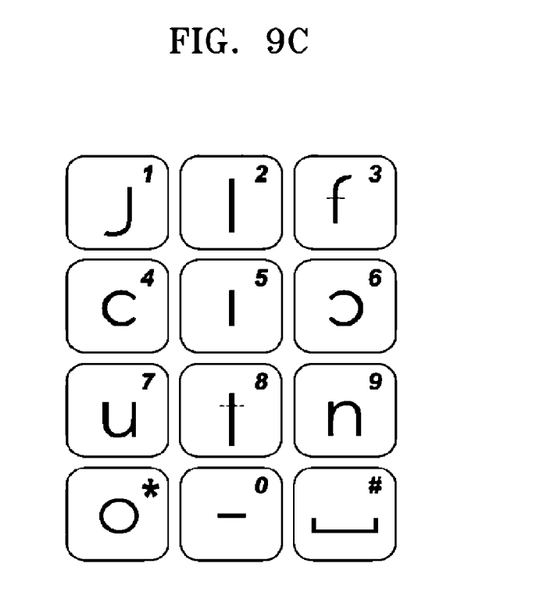
Figure 9D:
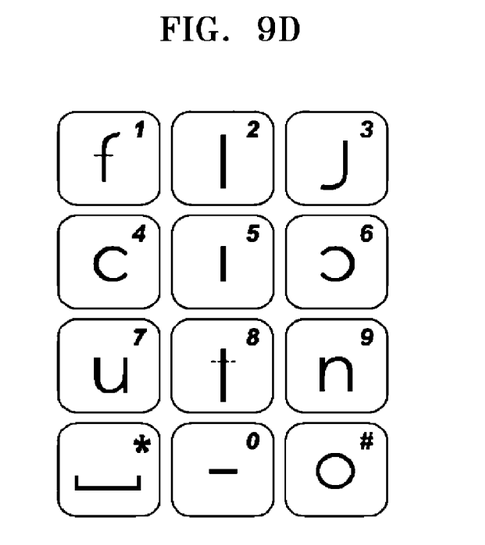

The key assignments illustrated in FIGS. 9B through 9D are also possible.

In FIGS. 9B through 9D, the positions of the basic elements ∪, ∩, ⌡, and ⌠ respectively assigned to the key numbers 1, 3, 7, and 9 in the key assignment illustrated in FIG. 9A are appropriately changed. However, the key assignments illustrated in FIGS. 9B through 9D are only examples of modified key assignments and the key assignment of the basic elements ∪, ∩, ⌡, and ⌠ may have a larger number of modifications.

Figure 10:
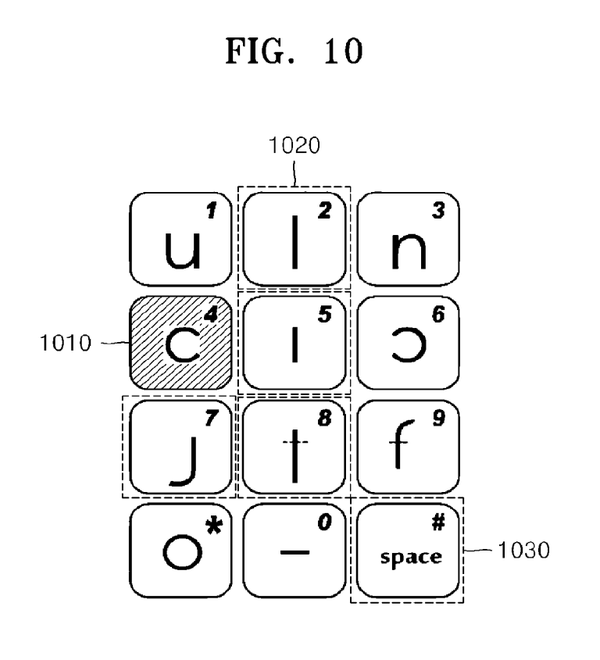
FIG. 10 illustrates a keypad for identifying subsequent basic elements that are available to be pressed after an initial basic element is pressed, according to an embodiment of the present invention.

FIG. 10 illustrates a keypad for identifying subsequent basic elements that are available to be pressed after an initial basic element is pressed, according to an embodiment of the present invention.

When a user inputs a letter by pressing two keys, an initial basic element is pressed and then a subsequent basic element is pressed. In this case, if subsequent basic elements that are available to be pressed after the initial basic element is pressed are automatically identified on the keypad, the user may press the subsequent basic element more conveniently.

In FIG. 10, it is assumed that the user presses a basic element ⊂ 1010 represented in a shaded manner. If the basic element ⊂ 1010 is pressed, the letter c may be input without additionally pressing another basic element, or the letters d, a, g, or q may be input by additionally pressing a basic element

|, ı, J, or T 1020. In this case, since a space key 1030 may be pressed to confirm input of the letter c, in a broad sense, the space key 1030 may also be a basic element that is available to be pressed after the basic element C 1010 is pressed.

If the basic element C 1010 is pressed, a keypad apparatus identifies the basic elements |, ı, J, and T 1020 from other non-available basic elements such that the user may easily recognize that only the basic elements |, ı, J, and T 1020 are available to be subsequently pressed. Various methods may be used to identify available basic elements from other non-available basic elements. For example, although the cellular phone 810 illustrated in FIG. 8 may not easily identify keys, if a backlight unit is included to light trims of individual keys of the available basic elements as represented by dashed squares in FIG. 10, the available basic elements may be visually identified from other non-available basic elements. Alternatively, numbers or the available basic elements on the individual keys may be lit by the backlight unit.

If the keypad is a touchpad, the available basic elements may be identified more easily. Since touch keys are graphically displayed on a screen, if the basic element C 1010 is pressed, the basic elements |, ı, J, and T 1020 that are available to be subsequently pressed may be displayed by using a different graphic so as to be easily recognized by the user. The different graphic may be obtained by using, for example, a different color, an inversed color, or a flickering effect.

After the basic element C 1010 is initially pressed, if any of the basic elements |, ı, J, and T 1020 is not pressed to input the letter d, a, g, or q, and if another basic element is pressed, input of the letter c may be confirmed.

When letters are input by pressing the basic elements, double key pressing for each letter is convenient. For example, single key pressing is followed by a pressing of a space bar. However, this method increases the number of key pressings.

In order to solve the above problem, the following method may be used.

A user may press an initial basic element for a short time and a subsequent basic element for a long time. In order to input a letter by pressing a single key, the initial basic element is pressed for a long time. For example, in order to input "change", the order of pressing basic elements is c | n c ı n c J _, and the periods of time for pressing them are -*-*--*-- (* represents a short time and - represents a long time).

Figure 11:
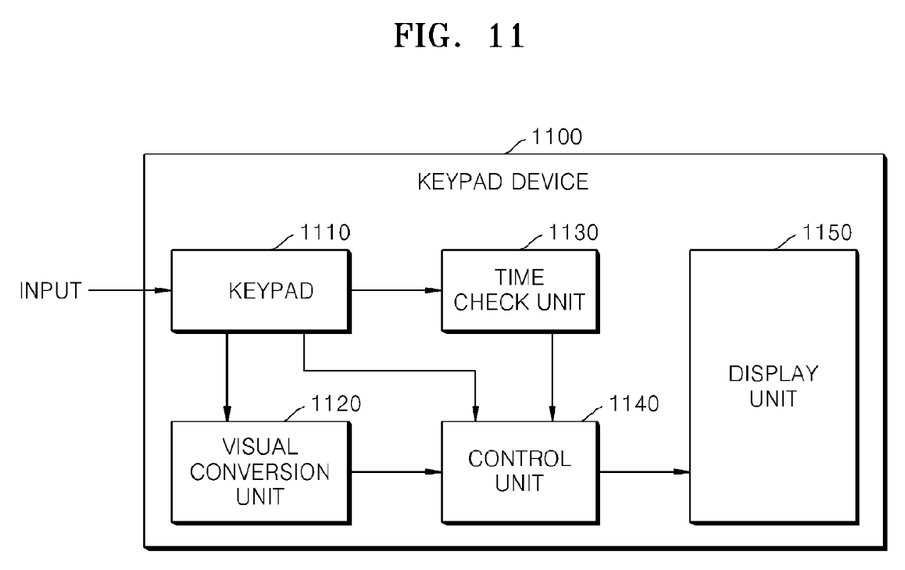
FIG. 11 is a block diagram of a keypad apparatus according to an embodiment of the present invention.

FIG. 11 is a block diagram of a keypad apparatus 1100 according to an embodiment of the present invention.

The keypad apparatus 1100 includes a keypad 1110, a visual conversion unit 1120, a time check unit 1130, a control unit 1140, and a display unit 1150. The keypad 1110 may be of a button type or a touch type and includes a plurality of keys to which basic elements U, |, ŋ, C, ı, Ↄ, J, T, Γ, ━, and O obtained by separating and symbolizing strokes of letters are assigned.

As described above in relation to FIG. 10, if two keys are sequentially pressed, the visual conversion unit 1120 visually identifies from other non-available keys subsequent keys that are available to be pressed to input letters after an initial key is pressed. As described above in relation to FIG. 10, the visual identification may be performed by using any visual identification method such as a method using a backlight, a different color, or an inversed color.

The time check unit 1130 measures a time taken for a key pressing to determine whether the key pressing is the final one. For example, if two keys are sequentially pressed and if a second key is pressed for a long time in comparison to a short time for pressing a first key, the time check unit 1130 recognizes the pressing of the second key as the final one. If a single key is pressed and if the first key is pressed for a long time, the time check unit 1130 may recognize the pressing of the first key as the final one. A user may set the short time and the long time.

The control unit 1140 controls data or processes of the keypad 1110, the visual conversion unit 1120, and the time check unit 1130, and displays letters input by pressing keys on the display unit 1150.

In addition, the control unit 1140 may convert the input letters into a phone number. For example, in the USA, an advertisement is made in many cases by providing a phone number corresponding to advertising text, e.g., a company or product name, input by using the phone-key keypad illustrated in FIG. 1. For example, in the case of a toy company "ALL TOYS", their phone number may be determined as 2(A)5(L)5(L)-8(T)6(O)9(Y)7(S) such that this phone number is pressed by selecting the company name on the phone-key keypad. If a stroke-combining keypad according to the present invention is used, the phone number may not be directly pressed as described above. Instead, letters corresponding to the company name are input on the keypad and then the input letters are recognized as numbers. Since the keypad according to the present invention is basically used to input small letters, "all toys" is input as the company name. Then, if a 'send' button is pressed, the control unit 1140 matches the letter a to number 2, the letter l to number 5, the letter t to number 8, the letter o to number 6, the letter y to number 9, and the letter s to number 7, such that the user may automatically call the number 255-8697.

Also, the above-described method and apparatus may also be useful to input Chinese or Japanese characters. Chinese is an ideogram-based language and it is not possible to separately assign all Chinese characters to keys on a keyboard. Accordingly, the pronunciation of a Chinese character may be input by using English letters and then the input English letters may be automatically or manually changed into the Chinese character corresponding to the pronunciation.

For example, if "shang" is input, an algorithm may display various Chinese characters corresponding to the pronunciation, e.g., 上, 尚, and 商, on a screen automatically or by pressing a predetermined key. Then, a user may select one of the various Chinese characters. Since this method eventually uses English letters, Chinese characters may also be efficiently input by using the method according to the present invention.

The same principle applies to Japanese characters. Although Japanese is a phonogram-based language, and it is not easy to separately assign all the fifty Japanese characters including hiragana and katakana characters to keys on a general keyboard. In this case, the pronunciation of a Japanese character may be input by using English letters and then the input English letters may be changed into the Japanese character corresponding to the pronunciation. For example, if "tsu" is input, the Japanese character つ may be input automatically or by pressing an additional key. Japanese characters may also be rapidly and easily input by using the method according to the present invention.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A method of generating letters, the method comprising:
   pressing, at a keypad device, one of or sequentially pressing two of basic elements ∪, I, ∩, ⊂, I, ⊃, J, ⊤, ⌐, and __ obtained by separating and symbolizing strokes of letters;
   generating, by the keypad device, a letter corresponding to the pressed basic element or the sequentially pressed basic elements; and
   displaying the determined letter,
   wherein the basic element I is used as a center element,
   wherein the basic elements I, ⊤, ⊂, and ⊃ are respectively assigned directly to top, bottom, left and right sides of the center element.

2. The method of claim 1, wherein the displaying of the determined letter comprises at least one of:
   recognizing sequential pressing of the basic elements ⊂ and I as the letter a;
   recognizing sequential pressing of the basic elements I and ⊃ as the letter b;
   recognizing single pressing of the basic element ⊂ as the letter c;
   recognizing sequential pressing of the basic elements ⊂ and I as the letter d;
   recognizing single pressing of the basic element __ as the letter e;
   recognizing single pressing of the basic element ⌐ as the letter f;
   recognizing sequential pressing of the basic elements ⊂ and J as the letter g;
   recognizing sequential pressing of the basic elements I and ∩ as the letter h;
   recognizing single pressing of the basic element I as the letter i;
   recognizing single pressing of the basic element J as the letter j;
   recognizing sequential pressing of the basic elements I and ⊂ as the letter k;
   recognizing single pressing of the basic element I as the letter l;
   recognizing double pressing of the basic element ∩ as m;
   recognizing single pressing of the basic element ∩ as the letter n;
   recognizing single pressing of the basic element ⊃ as the letter o;
   recognizing sequential pressing of the basic elements ⊤ and ⊃ as the letter p;
   recognizing sequential pressing of the basic elements ⊂ and ⊤ as the letter q;
   recognizing sequential pressing of the basic elements I and __ as the letter r;
   recognizing sequential pressing of the basic elements ⊂ and ⊃ as the letter s;
   recognizing single pressing of the basic element ⊤ as the letter t;
   recognizing single pressing of the basic element ∪ as the letter u;
   recognizing double pressing of the basic element I as the letter v;
   recognizing double pressing of the basic element ∪ as the letter w;
   recognizing sequential pressing of the basic elements ⊃ and ⊂ as the letter x;
   recognizing sequential pressing of the basic elements I and J as the letter y; and
   recognizing double pressing of the basic element __ as the letter z.

3. The method of claim 2, wherein the displaying of the determined letter further comprises at least one of:
   recognizing sequential pressing of the basic elements ⌐ and __ as the letter f;
   recognizing sequential pressing of the basic elements __ and I as the letter t;
   recognizing sequential pressing of the basic elements ∪ and J as the letter y; and
   recognizing sequential pressing of the basic elements I and J as the letter y.

4. The method of claim 2,
   wherein the letters a, b, d, k, p, and q are recognized by sequentially pressing two neighboring keys in the same direction and order as the writing direction and order thereof.

5. The method of claim 4, wherein the basic elements ∪ and ∩ are respectively assigned to left and right sides of the basic element I,
   wherein the basic elements J and ⌐ are respectively assigned to left and right sides of the basic element ⊤, and
   wherein the letters h, g, and y are recognized by sequentially pressing two neighboring keys in the same direction and order as the writing direction and order thereof.

6. The method of claim 4, wherein the basic elements J and ⌐ are respectively assigned to left and right sides of the basic element I,
   wherein the basic elements ∪ and ∩ are respectively assigned to left and right sides of the basic element ⊤, and
   wherein the letters g and y are recognized by sequentially pressing two neighboring keys.

7. The method of claim 2, wherein a first key is comprised in addition to keys to which the basic elements ∪, I, ∩, ⊂, I, ⊃, J, ⊤, ⌐, and __ are assigned, and
   wherein double key pressing is determined for each letter by pressing the first key after a single key is pressed.

8. The method of claim 2, wherein a second key is comprised in addition to keys to which the basic elements ∪, I, ∩, ⊂, I, ⊃, J, ⊤, ⌐, and __ are assigned,
   wherein, if the second key is repeatedly pressed after the letter a is recognized, the letter a is sequentially changed into at least one of "A, á, Á, ä, Ä",
   wherein, if the second key is repeatedly pressed after the letter e is recognized, the letter e is sequentially changed into at least one of "E, é, É", ,
   wherein, if the second key is repeatedly pressed after the letter i is recognized, the letter i is sequentially changed into at least one of "I, í, Í",
   wherein, if the second key is repeatedly pressed after the letter o is recognized, the letter o is sequentially changed into at least one of "O, ó, Ó, ö, Ö",
   wherein, if the second key is repeatedly pressed after the letter u is recognized, the letter u is sequentially changed into at least one of "U, ú, Ú, ü, Ü", and
   wherein, if the second key is repeatedly pressed after the letter n is recognized, the letter n is sequentially changed into at least one of "N, ñ, Ñ".

9. The method of claim 2, wherein, if a single key is pressed, a letter is recognized if a predetermined period of time passes after the single key is pressed.

10. The method of claim 2, wherein subsequent basic elements that are available to be pressed to input letters after an initial basic element is pressed are visually identified from other non-available basic elements.

11. The method of claim 3, wherein subsequent basic elements that are available to be pressed to input letters after an initial basic element is pressed are visually identified from other non-available basic elements.

12. A keypad apparatus for generating letters, the keypad apparatus comprising a plurality of keys to which basic elements ∪, l, ∩, ⊂, |, ◯, J, ↑, ſ, and ‗ obtained by separating and symbolizing strokes of letters are separately assigned, and the keypad apparatus recognizing letters by using a method comprising at least one of:
  recognizing sequential pressing of the basic elements ⊂ and | as the letter a;
  recognizing sequential pressing of the basic elements | and ◯ as the letter b;
  recognizing single pressing of the basic element ⊂ as the letter c;
  recognizing sequential pressing of the basic elements ⊂ and | as the letter d;
  recognizing single pressing of the basic element ‗ as the letter e;
  recognizing single pressing of the basic element ſ as the letter f;
  recognizing sequential pressing of the basic elements ⊂ and J as alphabet g;
  recognizing sequential pressing of the basic elements | and ∩ as the letter h;
  recognizing single pressing of the basic element | as the letter i;
  recognizing single pressing of the basic element J as the letter j;
  recognizing sequential pressing of the basic elements | and ⊂ as the letter k;
  recognizing single pressing of the basic element | as the letter l;
  recognizing double pressing of the basic element ∩ as the letter m;
  recognizing single pressing of the basic element ∩ as the letter n;
  recognizing single pressing of the basic element ◯ as the letter o;
  recognizing sequential pressing of the basic elements ↑ and ◯ as the letter p;
  recognizing sequential pressing of the basic elements ⊂ and ↑ as the letter q;
  recognizing sequential pressing of the basic elements | and ‗ as the letter r;
  recognizing sequential pressing of the basic elements ⊂ and ◯ as the letter s;
  recognizing single pressing of the basic element ↑ as the letter t;
  recognizing single pressing of the basic element ∪ as the letter u;
  recognizing double pressing of the basic element | as the letter v;
  recognizing double pressing of the basic element ∪ as the letter w;
  recognizing sequential pressing of the basic elements ◯ and ⊂ as the letter x;
  recognizing sequential pressing of the basic elements | and J as the letter y; and
  recognizing double pressing of the basic element ‗ as the letter z,
  wherein the basic element | is used as a center element,
  wherein the basic elements l, ↑, ⊂, and ◯ are respectively assigned directly to top, bottom, left and right sides of the center element.

13. The keypad apparatus of claim 12,
  wherein the letters a, b, d, k, p, and q are recognized by sequentially pressing two neighboring keys in the same direction and order as the writing direction and order thereof.

14. The keypad apparatus of claim 12, wherein the basic elements ∪ and ∩ are respectively assigned to left and right sides of the basic element l,
  wherein the basic elements J and ſ are respectively assigned to left and right sides of the basic element ↑, and
  wherein the letters h, g, and y are recognized by sequentially pressing two neighboring keys in the same direction and order as the writing direction and order thereof.

15. The keypad apparatus of claim 12, wherein the keypad apparatus is a touchpad apparatus.

* * * * *